(12) United States Patent
Engl et al.

(10) Patent No.: US 12,122,194 B2
(45) Date of Patent: Oct. 22, 2024

(54) SELECTION OF TIRE PRESSURE MONITORING SYSTEM (TPMS) SENSOR MODULES FOR RADIO-FREQUENCY (RF) COMMUNICATION BY ANGLE DETECTION

(71) Applicant: Infineon Technologies AG, Neubiberg (DE)

(72) Inventors: Thomas Engl, Munich (DE); Matthias Eberl, Taufkirchen (DE); Manfred Eder, Graz (AT); Michael Kandler, Sauerlach (DE); Maximilian Werner, Fischach (DE)

(73) Assignee: Infineon Technologies AG, Neubiberg (DE)

( * ) Notice: Subject to any disclaimer, the term of this patent is extended or adjusted under 35 U.S.C. 154(b) by 689 days.

(21) Appl. No.: 17/335,478

(22) Filed: Jun. 1, 2021

(65) Prior Publication Data
US 2022/0379669 A1    Dec. 1, 2022

(51) Int. Cl.
*B60C 23/04*   (2006.01)
*G01S 3/48*    (2006.01)
(Continued)

(52) U.S. Cl.
CPC ...... *B60C 23/0433* (2013.01); *B60C 23/0415* (2013.01); *G01S 3/48* (2013.01);
(Continued)

(58) Field of Classification Search
CPC ............ B60C 23/0433; B60C 23/0415; B60C 23/0444; B60C 23/0416; B60C 23/04;
(Continued)

(56) References Cited

U.S. PATENT DOCUMENTS 6,885,293 B2    4/2005  Okumura
10,625,545 B2 *  4/2020  Van Wiemeersch ......... H04W 12/033
(Continued)

FOREIGN PATENT DOCUMENTS

CN    1496867 A    5/2004
CN    106347041 A   1/2017
(Continued)

OTHER PUBLICATIONS

CN-109927494-A_translated (Year: 2019).*
CN-112389137-B_translated (Year: 2023).*
CN-113147277-A_translated (Year: 2021).*

*Primary Examiner* — Manish S Shah
*Assistant Examiner* — Michael J Singletary
(74) *Attorney, Agent, or Firm* — Harrity & Harrity, LLP

(57) ABSTRACT

A method of communicating with a tire pressure monitoring system (TPMS) sensor module includes transmitting, by the TPMS sensor module, a TPMS signal that includes a sensor identifier of the TPMS sensor module; performing, by an interface device, an angle of arrival measurement on the TPMS signal to whether an angular direction thereof with respect to an antenna array of the interface device is within a predetermined angular window; and determining, by the interface device, whether or not to communicate with the TPMS sensor module including establishing communication with the TPMS sensor module on a condition that the angular direction is within the predetermined angular window and not establishing communication with the TPMS sensor module on a condition that the determined angular direction is not within the predetermined angular window.

26 Claims, 8 Drawing Sheets

(51) Int. Cl.
*H04B 7/06* (2006.01)
*H04B 7/08* (2006.01)
*H04W 76/14* (2018.01)

(52) U.S. Cl.
CPC ......... *H04B 7/0602* (2013.01); *H04B 7/0802* (2013.01); *H04W 76/14* (2018.02)

(58) Field of Classification Search
CPC ... B60C 23/0422; B60C 23/0438; G01S 3/48; G01S 5/02; G01S 5/04; H04B 7/0602; H04B 7/0802; H04W 76/14
See application file for complete search history.

(56) References Cited

U.S. PATENT DOCUMENTS

| | | | |
|---|---|---|---|
| 10,737,541 B1 * | 8/2020 | Engl | B60C 23/0483 |
| 10,780,749 B2 | 9/2020 | Hassani et al. | |
| 2005/0273218 A1 | 12/2005 | Breed et al. | |
| 2006/0212193 A1 | 9/2006 | Breed | |
| 2017/0203619 A1 * | 7/2017 | Gow | B60C 23/0483 |
| 2019/0225034 A1 | 7/2019 | Wiemeersch et al. | |
| 2019/0232733 A1 | 8/2019 | Patel et al. | |
| 2020/0139772 A1 | 5/2020 | Vogelpohl | |
| 2020/0384815 A1 | 12/2020 | Adler et al. | |
| 2020/0398617 A1 | 12/2020 | Kandler et al. | |
| 2021/0046789 A1 * | 2/2021 | Engl | B60C 23/0416 |

FOREIGN PATENT DOCUMENTS

| | | | | |
|---|---|---|---|---|
| CN | 207217787 U | | 4/2018 | |
| CN | 109808428 A | | 5/2019 | |
| CN | 109927494 A | * | 6/2019 | ......... B60C 23/0442 |
| CN | 113147277 A | * | 7/2021 | ............ B60C 23/04 |
| CN | 112389137 B | * | 12/2023 | ........... B60C 23/009 |
| FR | 3090488 A1 | | 6/2020 | |
| JP | 2010156566 A | | 7/2010 | |
| KR | 20170039440 A | | 4/2017 | |
| KR | 20180065544 A | | 6/2018 | |
| WO | 2014106969 A1 | | 7/2014 | |

* cited by examiner

SELECTION OF TIRE PRESSURE MONITORING SYSTEM (TPMS) SENSOR MODULES FOR RADIO-FREQUENCY (RF) COMMUNICATION BY ANGLE DETECTION

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter, and a coin battery cell.

Principally, the sensor module measures the tire pressure and uses a unidirectional link to transmit the measurement data to a central unit in the vehicle. Since battery cannot be changed, sensor module lifetime is determined by battery lifetime. A major portion of the power consumption is generated by the RF transmission. Hence, it is an important task to reduce power consumption for RF transmission as much as possible.

The sensor module may also have a low-frequency (LF) receiver, which is used to configure the TPMS sensor module after mounting sensor module to the tire in the vehicle production or in a repair garage (e.g., in case of replacement modules or firmware update for maintenance of sensor modules which are already in use). Typically, an external configuration unit, such as the vehicle electronic control unit (ECU) or a configuration tool, configures the TPMS sensor modules.

One advantage of the LF signal is its short range, which ensures that only one single TPMS sensor module is close enough to the transmitter to receive the LF signal. This advantage also becomes a disadvantage in that the configuration unit needs to be very close to the TPMS sensor module. That means that either the TPMS sensor modules need to be moved into the vicinity of the configuration unit or vice versa.

Typically, the downlink communication from the sensor module to the vehicle is implemented via the RF transmitter at 315 or 434 MHz, whereas the uplink communication to the sensor module is implemented via the LF receiver at 125 kHz. Thus, two communication devices with two communication channels are used for bidirectional communication between the vehicle and the sensor module. This increases the cost of the overall TPMS sensor module.

On the other hand, if the LF receiver were to be replaced with an RF receiver, cost could be decreased by implementing one RF technology for bi-directional communication. However, RF signals have a much longer range and the risk of cross-talking with other TPMS sensor modules increases.

In order to properly assess each tire, the configuration unit must be able to connect with each TPMS sensor module on an individual basis. Meaning, the configuration unit must be able to detect one or more TPMS sensor modules and select one of the TPMS sensor modules based on certain criteria to (1) form a communication link therewith so that it can configure the TPMS sensor module accordingly and (2) subsequently distinguish communications received therefrom from the other TPMS sensor modules. It also means that configuration unit should localize each TPMS sensor module in that it knows which TPMS sensor module is located at which tire position (e.g., front left, rear right, etc.).

In the case that the communication technology changes from LF to RF, new methods have to be found to communicate with only one selected TPMS sensor module, even if others are close by. Therefore, an improved TPMS capable of detecting and selectively communicating with each TPMS sensor module may be desirable.

SUMMARY

One or more embodiments provide a tire pressure monitoring system (TPMS) including a TPMS sensor module and a communication interface device. The TPMS sensor module has a sensor identifier (ID) and includes: a pressure sensor configured to measure an internal air pressure of a first tire and generate first tire pressure information; and a first radio frequency (RF) transceiver configured to transmit a TPMS signal that includes at least the sensor ID. The communication interface device includes a first antenna array configured to receive the TPMS signal and a first processing circuit configured to perform a first angle of arrival (AoA) measurement on the TPMS signal to determine whether a first angular direction of the TPMS sensor module with respect to the first antenna array is within a first predetermined angular window, wherein the processing circuit is further configured to establish communication with the TPMS sensor module on a first condition that the first angular direction of the TPMS sensor module is within the first predetermined angular window and not establish communication with the TPMS sensor module on a second condition that the first angular direction of the TPMS sensor module is not within the first predetermined angular window.

One or more embodiments provide a method of communicating with a TPMS sensor module, the method includes: transmitting, by the TPMS sensor module, a TPMS signal that includes at least a sensor identifier (ID) of the TPMS sensor module; performing, by a communication interface device, an angle of arrival (AoA) measurement on the TPMS signal to determine whether an angular direction thereof with respect to an antenna array of the communication interface device is within a predetermined angular window; and determining, by the communication interface device, whether or not to communicate with the TPMS sensor module, including establishing communication with the TPMS sensor module on a first condition that the angular direction is within the predetermined angular window and not establishing communication with the TPMS sensor module on a second condition that the angular direction is not within the predetermined angular window.

One or more embodiments provide a tire pressure monitoring system (TPMS) including a TPMS sensor module and a communication interface device. The communication interface device includes a first antenna array and a first radio frequency (RF) transceiver configured to transmit first phase shifted signals via the first antenna array according to a first antenna switching scheme, wherein at least one of the first phase shifted signals includes first angle of departure (AoD) information. The TPMS sensor module includes a pressure sensor configured to measure an internal air pressure of a first tire and generate first tire pressure information; a second RF transceiver configured to receive the first phase shifted signals; and a processing circuit configured to use the first AoD information to perform a first AoD measurement on the first phase shifted signals to determine a first angular direction of the communication interface device with respect to the TPMS sensor module, wherein the processing circuit is configured to determine whether the first angular direction is within a first angular window, and transmit a response signal to the communication interface device on a first condition that the first angular direction is within the first angular window.

One or more embodiments provide a method of communicating with a TPMS sensor module, the method including: transmitting, by a communication interface device, phase shifted signals according to an antenna switching scheme, wherein at least one of the phase shifted signals includes first angle of departure (AoD) information; performing, by the TPMS sensor module, an angle of departure (AoD) measurement on the phase shifted signals to determine whether an angular direction of the communication interface device with respect to the TPMS sensor module is within an angular window; transmitting, by the TPMS sensor module, a response signal to the communication interface device in response to determining that the angular direction is within the angular window; and determining, by the TPMS sensor module, not to transmit the response signal responsive to the phase shifted signals in response to determining that the angular direction is not within the angular window.

BRIEF DESCRIPTION OF THE DRAWINGS

Embodiments are described herein making reference to the appended drawings.

DETAILED DESCRIPTION

Figure 1:
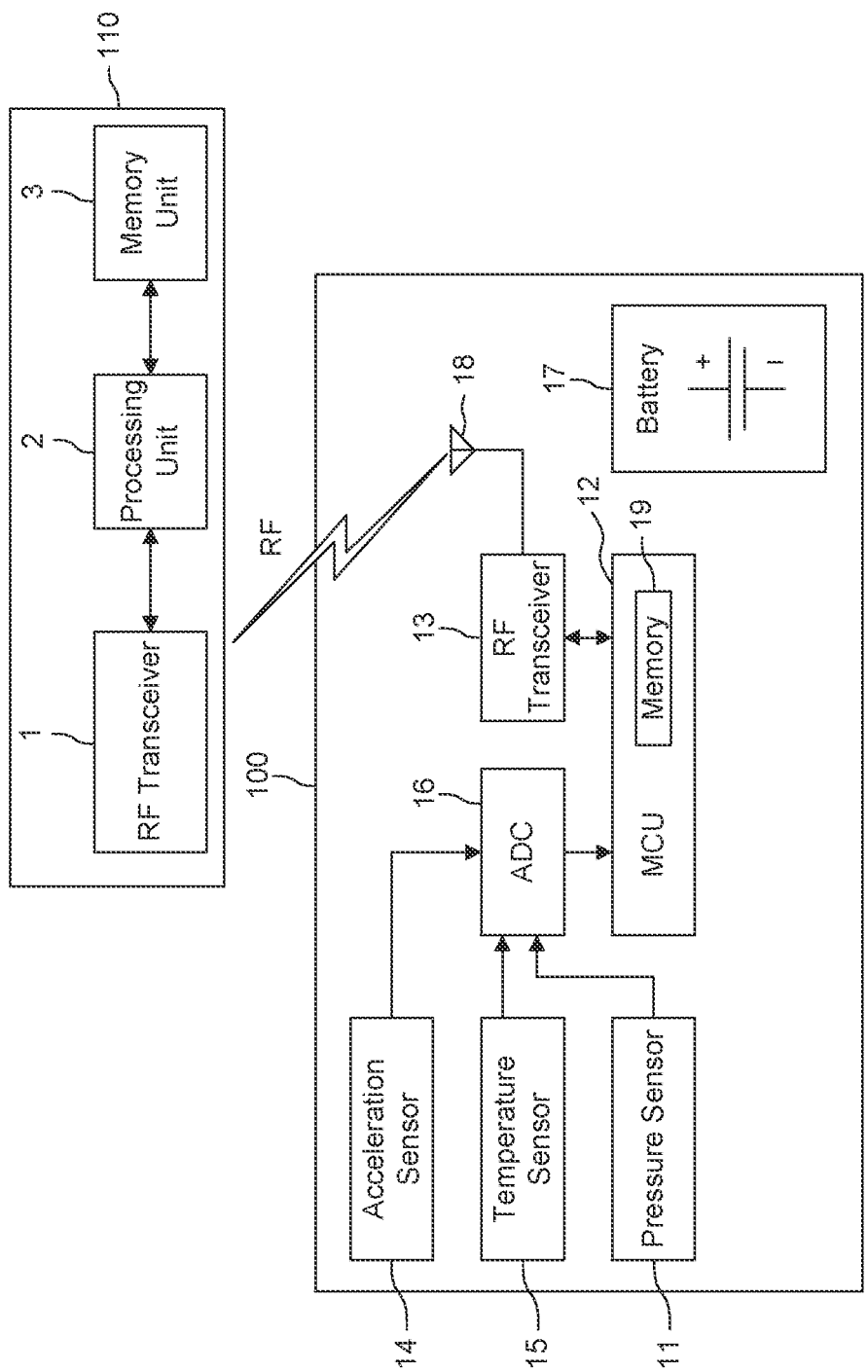
FIG. 1 illustrates a tire pressure monitoring system (TPMS) according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, an acceleration, a temperature, a force, a current, or a voltage, but is not limited thereto. A sensor device, as described herein, may be an angle sensor, a linear position sensor, a speed sensor, motion sensor, a pressure sensor, acceleration sensor, temperature sensor, a magnetic field sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

A sensor circuit may be referred to as a signal processing circuit and/or a signal conditioning circuit that receives the signal (i.e., sensor signal) from the pressure field sensor element in the form of raw measurement data. The sensor circuit may include an analog-to-digital converter (ADC) that converts the analog signal from the pressure sensor to a digital signal. The sensor circuit may also include a digital signal processor (DSP) that performs some processing on the digital signal (e.g., to prepare tire pressure information for transmission). Therefore, the sensor package comprises a circuit which conditions and amplifies the small signal of the pressure sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

According to one or more embodiments, a pressure sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

FIG. 1 illustrates tire pressure monitoring system according to one or more embodiments. The tire pressure monitoring system includes a monolithic TPMS sensor module 100 and a communication interface device 110 that is configured to communicate with the TPMS sensor module 100. The TPMS sensor module 100 is a direct TPMS sensor mounted inside a tire. The TPMS sensor module 100 includes a pressure sensor 11, a microcontroller unit (MCU) 12, a radio frequency (RF) transceiver 13, an optional acceleration sensor 14, an optional temperature sensor 15, an ADC 16, a battery 17, and an antenna 18.

In particular, the acceleration sensor 14 may be a single axis or multi-axis accelerometer that is used for measuring the acceleration generated by car movement (e.g. for motion detection) and/or measuring the Earth's gravitational field. In the latter case, measuring the earth gravitational field results in a sine signal with 1 g amplitude due to tire rotation. In other words, sinusoidal signal generated from the motion of the acceleration sensor moving through the Earth's gravitational field as it rotates about an axis (i.e., as the tire rotates about its axis). This sinusoidal signal is referred to as +/−1 g signal. This +/−1 g signal can be used to calculate of the angular position of the TPMS sensor module with respect to the wheel axis.

The pressure sensor 11 can be incorporated as part of a typical semiconductor technology, and may be a microelectromechanical systems (MEMS) pressure sensor. Therefore, the pressure sensor 11 can enable the TPMS sensor module 100, to aid in monitoring tire pressure. The pressure sensor 11, acceleration sensor 14, and the temperature sensor 15 each measure a corresponding physical quantity and provides analog sensor information in the form of electrical signals to the ADC 16, which converts the analog signals into digital signals before providing the MCU 12 with digital sensor information.

Thus, the pressure sensor 11 is electrically connected to the MCU 12 and configured to measure the internal air pressure of a tire. The TPMS sensor module 100 may also include the acceleration sensor 14 electrically connected to the MCU 12 and configured to detect and/or measure an acceleration of the tire (e.g., for detecting a motion of a vehicle or to generate a +−1 g signal used for sensing a rotation direction of the tire). The TPMS sensor module 100 may also include the temperature sensor 15 electrically connected to the MCU 12 and configured to detect and/or measure an internal temperature of the tire, which may be used for compensating one or more pressure sensor measurements. For example, a measured temperature may be used for correcting the temperature dependency of slope and offset of the sensor signal.

A power supply 17 (e.g., a battery cell) is further provided to supply power to the TPMS sensor module 100 and its components.

The MCU 12 receives tire pressure information in the form of measurement values from the pressure sensor 11, and processes the information. The MCU 12 may store the tire pressure information and/or prepare the tire pressure information for the RF transceiver 13. The MCU 12 may further receive acceleration information from the acceleration sensor 14 and temperature information from the temperature sensor 15. The RF transceiver 13 receives the collected data for transmission from the MCU 12.

The RF transceiver 13, coupled to the antenna 18, is configured to communicate with an interface device 110, such as a vehicle electronic control unit (ECU) or a transponder, via the antenna 18. While not limited thereto, the RF transceiver 13 may be a Bluetooth Low Energy (BLE) transceiver configured to transmit and receive Bluetooth signals. As a result, the TPMS sensor module 100 is a BLE device that remains in a low power state (e.g., a sleep mode)

except when activated or woken by a wake-up signal (e.g., a Bluetooth wake-up signal) and connected to another Bluetooth device via an RF data communication link for data communication. The power states are controlled by the MCU 12.

The RF transceiver 13, along with the MCU 12, is used to establish an RF data communication link with the interface device 110 depending on the outcome of either Angle-of-Arrival (AoA) measurements performed by the interface device 110 or Angle-of-Departure (AoD) measurements performed by the MCU 12.

For those methods directed to AoD, the MCU 12 may be in sleep mode until it receives a wake-up signal, e.g. a signal on an advertising channel from the interface device 110 via its transceiver 13. The wake-up signal may be, for example, an advertising signal or any other signal that may trigger the MCU 12 to wake up from a low power state, such as sleep mode. When the MCU 12 receives the wake-up signal, the MCU 12 wakes up into normal power mode and also enters into an advertising-discovery mode. During the advertising-discovery mode, the MCU 12 and the interface device 110 determine whether they are to connect and thereby establish an RF (Bluetooth) data communication link for bi-directional data communication based on certain criteria to be discussed below. If it is determined that an RF data communication link is to be established, the RF data communication link is made and the MCU 12 enters into a connected mode during which bi-direction data communication with the interface device 110 is enabled. After the communication has been completed, the RF data communication link is disconnected and the MCU 12 again enters sleep mode. On the other hand, if it is determined that an RF data communication link is not to be established, the MCU 12 reenters sleep mode without establishing the RF data communication link with the interface device 110.

For those methods directed to AoA, the MCU 12 may be in sleep mode until it decides to wake up and attempts to establish a connection (e.g., a bi-directional communication channel) with the interface device 110. The MCU 12 may decide to wake up periodically to transmit a wake-up signal, e.g., based on a detected pressure change, a measured acceleration exceeding an acceleration threshold, through regular internal wake-ups that occur at a predetermined interval or responsive to an RF wake-up signal. The interval during which the TPMS sensor module 100 attempts to establish a connection with the interface device 110 may be referred to as an advertising mode. During advertising mode, the TPMS sensor module 100 may transmit a wake-up signal to the interface device 110 and await a response therefrom. The MCU 12 determined whether establish an RF data communication link for bi-direction data communication with the interface device 110 based on the response signal received from the interface device 110.

It is to be noted that there is a distinction between an advertising channel and an RF data communication link. The advertising channel is used for transmitting a wake-up signal (e.g., advertising packets) and discovery information that can be exchanged in order to determine whether or not to establish RF data communication link. It has limited bandwidth that is not suitable for transmitting large amounts of data. The RF data communication link is a data channel used in connected mode for exchanging data packets, including large amounts of data such as configuration information and sensor data.

The RF transceiver 13 is configured to transmit sensor data (e.g., pressure sensor data, acceleration sensor data, temperature sensor data, acceleration sensor data) or other feedback information, including feedback information derived from the sensor data (e.g., velocity/speed data, tire rotation period data, tire load data, etc.) to the interface device 110. The RF transceiver 13, along with the MCU 12, is also used to establish an RF data communication link with the interface device 110 depending on the outcome of either Angle-of-Arrival (AoA) measurements performed by the interface device 110 or Angle-of-Departure (AoD) measurements performed by the MCU 12.

Thus, the RF transceiver 13 is electrically connected to the MCU 12 and is configured to transmit an RF signal that carries the sensor data and/or feedback information to the interface device 110. The RF signal may be transmitted by the transceiver 13 autonomously or in response to the MCU 12 receiving data in the form of information, a wake-up signal, a wake-up signal, an acknowledgement, or a command from the interface device 110, where this data is received by the RF transceiver 13.

In one embodiment, using AoA measurements, the interface device 110 is configured to detect, via one or more RF signals, one or more TPMS sensor modules and select one of the TPMS sensor modules for establishing a communication link therewith based on satisfying predetermined criteria. Once the communication link is established between the interface device 110 and the selected TPMS sensor module, the interface device 110 can send configuration information, commands, and other data to the selected TPMS sensor module. It can also receive sensor data and other data from the selected TPMS sensor module.

In another embodiment, using AoD measurements, the TPMS sensor module 100 is configured to determine whether it satisfies certain criteria for establishing the RF data communication link, and if so, responds to the interface device 110 accordingly in order to establish the RF data communication link.

The interface device 110 may be an ECU integrated in the body of the vehicle or a transponder external to the vehicle used, for example, in the production line or at an auto repair shop. As a transponder, the interface device may be a setting tool, a diagnostic and testing tool, or any other RF transceiver. The interface device 110 is configured to interface with each TPMS sensor module 100 for localization thereof and communication therewith.

The interface device 110 includes an RF transceiver 1 for transmitting wake-up signals and configuration information and for receiving sensor data, discovery information, and/or localization data. The interface device 110 includes a processing unit 2 comprising one or more processors for processing the sensor data, discovery information, and/or localization data and for making AoA measurements for selecting one of the TPMS sensor modules for data communication. The interface device 110 further includes a memory unit 3 for storing processed sensor data or other information (e.g., tire information). It will be appreciated that while examples may refer to using Bluetooth low energy (BLE) signals for communication, other types of RF signals may be used instead.

The interface device 110 may be configured to receive the sensor data and derive information from the sensor data (e.g., contact patch data, contact patch duration data, velocity/speed data, tire rotation data, tire load data) or may receive one or more of such information directly from the RF transceiver 13 (i.e., from the TPMS sensor module 100).

In addition, the interface device 110 may be configured to receive localization data and determine the wheel location for each TPMS sensor module 100. Localization data may include AoA information used by the interface device for selecting a TPMS sensor module located in a target angular window or range with which to establish an RF data communication link.

As mentioned above, the TPMS sensor module 100 may include an acceleration sensor 14 electrically connected to the MCU 12 and configured to detect and/or measure a centrifugal acceleration of the tire and/or a tangential acceleration of the tire, and generate acceleration sensor data. The acceleration sensor data may be used for detecting a motion of a vehicle, calculating a vehicle velocity or speed (m/s), calculating a tire rotation period (s or ms), calculating a tire wear of a tire, calculating a traveled distance (km), determining a rotation direction of the TPMS sensor module 100 corresponding to the rotation of the wheel, and ultimately determining on which side (e.g., left or right) of an axle the TPMS sensor module 100 is located.

As noted above, the acceleration sensor 14 may be an accelerometer integrated on a single chip and that has at least one sensitivity axis used for generating a +/−1 g signal. The accelerometer may further include a second sensitivity axis that is used for generating another +/−1 g signal. The MCU 12 may be configured to receive the two +/−1 g signals, and determine a phase shift therebetween.

In turn, the MCU 12 may be configured to generate localization information of the TPMS sensor module 100 based on the phase shift and a localization algorithm (i.e., indicating vehicle side at which the TPMS sensor module 100 is located), or may transmit the phase shift information as localization information to the interface device 110 or the localization module (e.g., localization module 312 in FIG. 2), which then makes the vehicle side determination based on the phase shift information and the localization algorithm. In the end, the TPMS sensor module may be fully located (i.e. front left, front right, etc.) by the interface device 110.

The TPMS sensor module 100 also includes a receiver path that includes the RF transceiver 13 and the MCU 12. The receiver path may be used for receiving communication data from the interface device 110. Communication data may include, but is not limited to configuration information, programming information (e.g., for reflashing firmware code), or control information for the TPMS sensor module 100. The RF transceiver 13 may demodulate the received communication signal and provide the data to the MCU 12.

The MCU 12 further includes memory 19 that is configured to store information therein. Memory 19 may also be provided external to the MCU 12, and instead electrically coupled thereto. For example, memory 19 may be used to store tire information for each tire, such as at least one of tire type, tire dimensions (e.g., diameter), tire mileage, or tire wear. Tire information may be separately provided for each tire and may include a brand of tire, tire dimensions, tire materials, tire stiffness parameters, tire tread information, tire season information (e.g., winter or summer tire), and other tire characteristics. Memory 19 may also store numerical values that are representative of a mileage of a tire and/or wear of the tire. These numerical values may be calculated by the MCU 12, for example, from acceleration sensor data.

Alternatively, the interface device 110 may store one or more pieces of tire information, and, may calculate the numerical values that are representative of a mileage of a tire and/or wear of the tire, for example, from acceleration sensor data and the tire information, and may store the numerical values in memory at the interface device 110.

The MCU 12 includes at least one processing circuit (e.g., a signal processor) that receives sensor signals including various sensor data from the pressure sensor 11, the acceleration sensor 14, and the temperature sensor 15, and performs signal processing and/or conditioning thereon. For example, the at least one processing circuit may convert raw sensor measurements into sensor values (e.g., tire pressure values, acceleration values, and temperature values). In addition, the at least one processing circuit of the MCU 12 may calculate one or more of contact patch data, contact patch duration data, velocity/speed data, tire rotation data, tire wear data, and tire load data, as described herein.

The MCU 12 may also control one or more of the sensor devices via control signals. For example, the MCU 12 may prompt one or more sensor devices to make a measurement or may request information stored in memory 19.

In order for the MCU 12 to calculate the vehicle velocity and the traveled distance, tire diameter information stored in memory 19 may be used along with the acceleration sensor data.

Alternatively, the MCU 12 may output sensor data to the RF transceiver 13 for transmission to the interface device 110.

The embodiments are directed to selecting one TPMS sensor module for RF data communication, even if other TPMS sensor modules are in the range of the RF signals. The selection schemes are based on directional information that serves as a basis for discriminating between different TPMS sensor modules in order to make a selection to one of the TPMS sensor modules. A TPMS sensor module is selected or responds to a received wake-up signal if it is positioned in a certain angular direction from the interface device 110.

Alternatively, using more than just one interface device 110, not only the angular direction but also the actual position of the TPMS sensor module can be used as selection criteria. The actual position can in this case be determined from the directional information measured by both interface device 110, for example, via triangulation.

The directional information can be obtained by one of the following two methods: AoA measurements performed by the interface device(s) 110 or AoD measurements performed by the TPMS sensor modules. The advantage of these methods is that they can also be used in frequency bands with higher range, such as in the Bluetooth band. Therefore, they would enable the switch from the current LF receiver setup to Bluetooth Low Energy. Moreover, Bluetooth is not limited to short distances and therefore could also be used by the vehicle's central unit itself (i.e., the vehicle ECU). Bluetooth Low Energy communication, for example, without using the disclosed directional information and selection scheme would risk communicating with other unintended TPMS sensor modules that are in the RF communication range but not in focus (e.g., TPMS sensor modules located in other vehicles).

Figure 2:
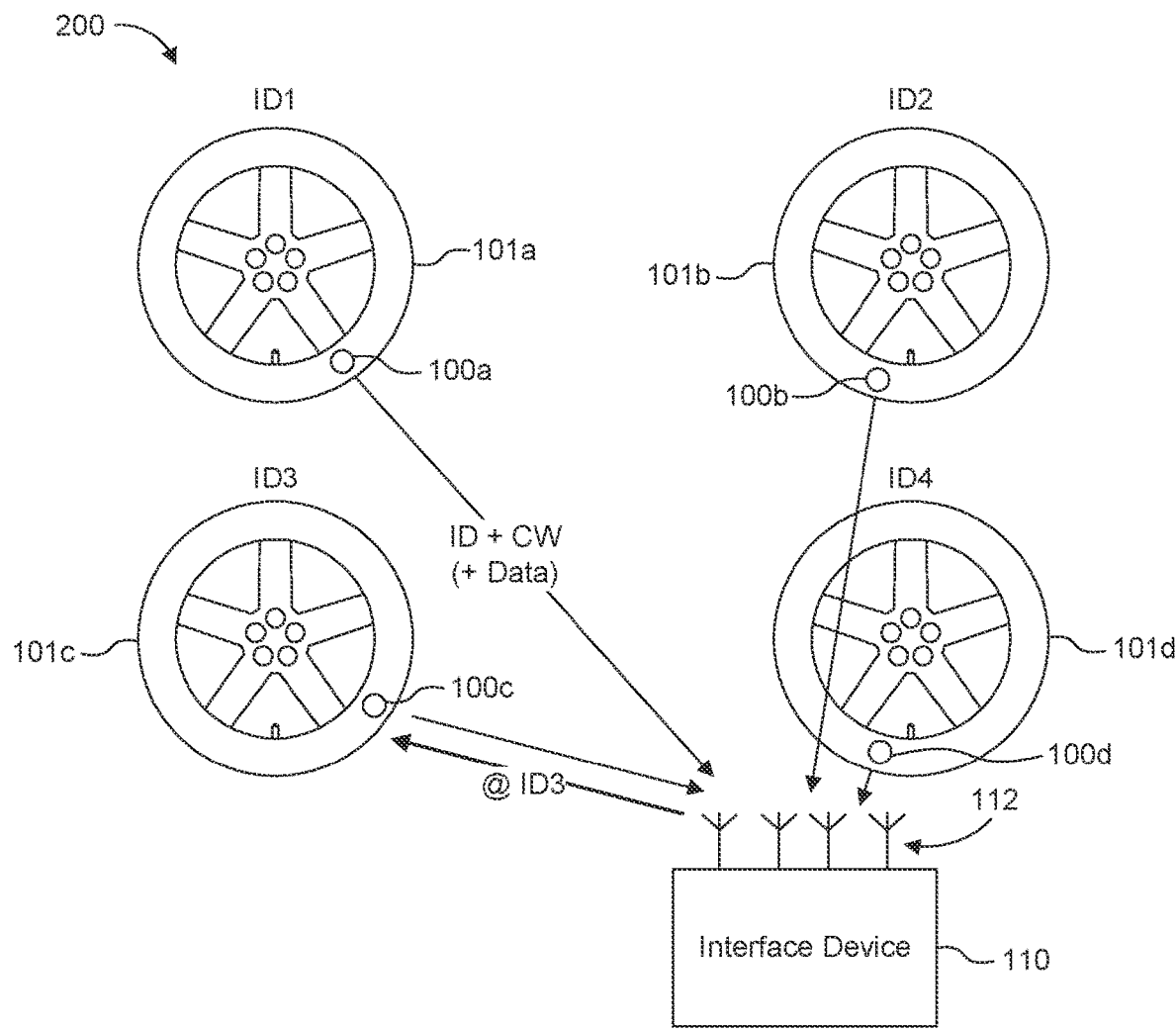
FIG. 2 is a schematic view of a TPMS sensor module communication system according to one or more embodiments.

FIG. 2 is a schematic view of a TPMS sensor module communication system 200 according to one or more embodiments. The TPMS sensor module communication system 200 uses AoA measurements for selecting a TPMS sensor module for communication. The TPMS sensor module communication system 200 includes the interface device 110 that includes an antenna array 112 used for transmitting and receiving RF signals. During a discovery and selection phase, the antennas of the antenna array 112 are used to detect one or more TPMS sensor modules and select one of the TPMS sensor modules that lies in a certain angular range or angular window with respect to the antenna array 112 for a connected communication phase. To do this, the interface device 110 uses the antenna array 112 to measure angular information with respect to each TPMS sensor module.

The TPMS sensor module communication system 200 also includes a plurality of TPMS sensor modules 100a-100d each assigned with a unique identifier ID1, ID2, ID3, and ID4. In this case, the TPMS sensor modules 100a-100d are arranged inside a respective tire 101a-101d but could also be arranged outside a tire in a production line. Each of the TPMS sensor modules 100a-100d are arranged at different angular directions (angles) with respect to the antenna array 12. Thus, each of the TPMS sensor modules 100a-100d is located in a different angular range or window with respect to the antenna array 12. As a result of each unique angular direction of the TPMS sensor modules 100a-100d, the interface device 110 is able to select each one individually for establishing the RF data communication link therewith based on their angular position and is further able to ensure that no other TPMS sensor modules are triggered unintentionally.

The interface device 110 is configured to select one of the TPMS sensor modules 100a-100d by performing AoA measurements via the antenna array 112. The interface device 110 may initially send a wake-up signal to initiate the selection process. The wake-up signal may be a request to those TPMS sensor modules 100a-100d in the vicinity to transmit a TPMS signal that contains at least their respective unique ID. Thus, the wake-up signal triggers the TPMS sensor modules 100a-100d to wake up from a low power state in order to transmit their ID. Optionally, the transmissions from the TPMS sensor modules 100a-100d can also contain or be followed by a constant carrier wave (CW). This carrier wave may be used if the accuracy of the AoA measurement has to be improved or may even be mandatory under some communication protocols, such as BLE.

In the alternative to the interface device 110 transmitting a wake-up signal, each TPMS sensor module 100a-100d (while disconnected from the interface device 110) may be configured to periodically wake up from its low power state to transmit its TPMS signal with its sensor ID. In this case, the interface device 110 may monitor for a TPMS signal transmitted in a predetermined angular window with respect to the antenna array 12 and transmits a response signal including one or more messages addressed to a particular TPMS sensor module when a TPMS signal is received from the monitored predetermined angular window. The messages are addressed to a particular TPMS sensor module by including the sensor ID of that TPMS sensor module in the header of the messages. The interface device 110 ignores all other TPMS signals that are received outside of this monitored predetermined angular window.

A TPMS sensor module that receives a message address thereto (i.e., containing its sensor ID), is further configured to process the payload of the message. Those TPMS sensor modules that receive a message not addressed thereto (i.e., containing a different sensor ID), is further configured to ignore payload of the message or otherwise discard the message.

Since each antenna of the antenna array 12 has a different distance to a respective TPMS sensor module, each antenna will receive the TPMS signal from a TPMS sensor module at a different time. This in turn leads to phase shifts between the antennas that can be measured by the interface device 110. As a result, the TPMS signal used for AoA measurements may be generally referred to as a phase shifting signal. In this way, for each TPMS signal, the phase shifts between the antennas originating from the differences in travel distance from respective TPMS sensor modules 100a-100d can be obtained by the interface device 110. In particular, the interface device 110 may generate a phase shift profile for each TPMS signal (i.e., for each TPMS sensor module 100a-100d), and determines the direction of the source of the RF signal (i.e., an angular direction of an incoming RF signal) based on the phase shift profiles. By linking this angular direction information of the received signal to the sensor ID received in the same received signal from a TPMS sensor module, the angular directions can be identified and linked to each sensor ID (i.e., to each TPMS sensor module 100a-100d). Thus, the interface device 110 can unambiguously calculate the angular direction of each TPMS sensor module 100a-100d from the measured phase shifts for their respective TPMS signals.

The interface device 110 determines which TPMS sensor module (i.e., which sensor ID) transmitted a TPMS signal from a predetermined angular window by comparing the determined angular directions of all TPMS sensor modules to the predetermined angular window. Alternatively, the interface device 110 can compare the phase shift profile directly with a predefined set of phase shift ranges (i.e., a measured phase shift between antennas 1 and 2 is within a pre-defined phase shift range, a measured phase shift between antennas 2 and 3 is within another pre-defined phase shift range, etc.). If all measured phase shifts between respective pairs of antennas are within their respective pre-defined phase shift ranges, then it can be inferred that the angular direction of the TPMS sensor module from which the TPMS signal originates is within the predetermined angular window. On the other hand, if one or more measured phase shifts between respective pairs of antennas is not within its respective pre-defined phase shift range, then it can be inferred that the angular direction of the TPMS sensor module from which the TPMS signal originates is not within the predetermined angular window.

The interface device 110 selects the TPMS sensor module whose angular direction satisfies the predetermined angular window and establishes an RF data communication link therewith. For example, the interface device transmits one or more messages addressed to the sensor ID of the selected TPMS sensor module. In this example, the interface device 110 has determined that TPMS sensor module 110c with ID3 has satisfied the angular window criteria and transmits addressed messages to TPMS sensor module 100c. The addressed messages may include a request for data (e.g., sensor data and/or diagnostic data) from the selected TPMS sensor module 100c.

By receiving an RF signal addressed via sensor ID to the selected TPMS sensor module, the RF data communication link is established and the selected TPMS sensor module is capable of performing bi-directional data communication with the interface device 110. The other TPMS sensor modules, having not been selected for communication, reenter their low power state where they can wait for the next wake-up signal.

The interface device 110 may change the predetermined angular window in order to communicate with different TPMS sensor modules. If the interface device 110 is a vehicle ECU, the vehicle ECU may be programed with relative angular window information of each wheel. Thus, the vehicle ECU can select which TPMS sensor module to communicate with by adjusting the predetermined angular window to correspond to a certain area of the vehicle that targets a particular wheel region (front left, front right, rear left, rear right, etc.). The interface device 110 implemented as a tool external to the vehicle may perform a similar function.

Alternatively, the predetermined angular window may remain fixed and the TPMS sensor modules may be moved laterally past the interface device such that each TPMS sensor module is eventually moved into the predetermined angular window to be selected by the interface device 110.

In the alternative to measuring and analyzing the TPMS signals from each of the TPMS sensor modules 100a-100d, with the help of phase shifters, an angular reception window of the antenna array 112 can be configured by the interface device 110 such that only TPMS signals arriving from an angular direction within the angular reception window can be received. Thus, TPMS signals arriving from outside the angular reception window of the antenna array 112 would not be received and/or filtered out. In this way, only one of the TPMS sensor modules can satisfy the angular reception window requirement, and the interface device 110 is configured to select the TPMS sensor module whose TPMS signal is received within the angular reception window of the antenna array 112.

In summary, the TPMS sensor module 100 transmits an advertising packet that is followed by a carrier wave (e.g., a constant tone extension). The advertising packet contains the duration of the carrier wave. The interface device 110 receives the advertising packet and the carrier wave. While receiving the carrier wave, the interface device 110 switches through its antennas and measures the phase difference between them to determine the angle of arrival and then subsequently compares the angle of arrival to a predetermined angular window to determine whether to establish a data communication link with the TPMS sensor module 100.

Figure 3:
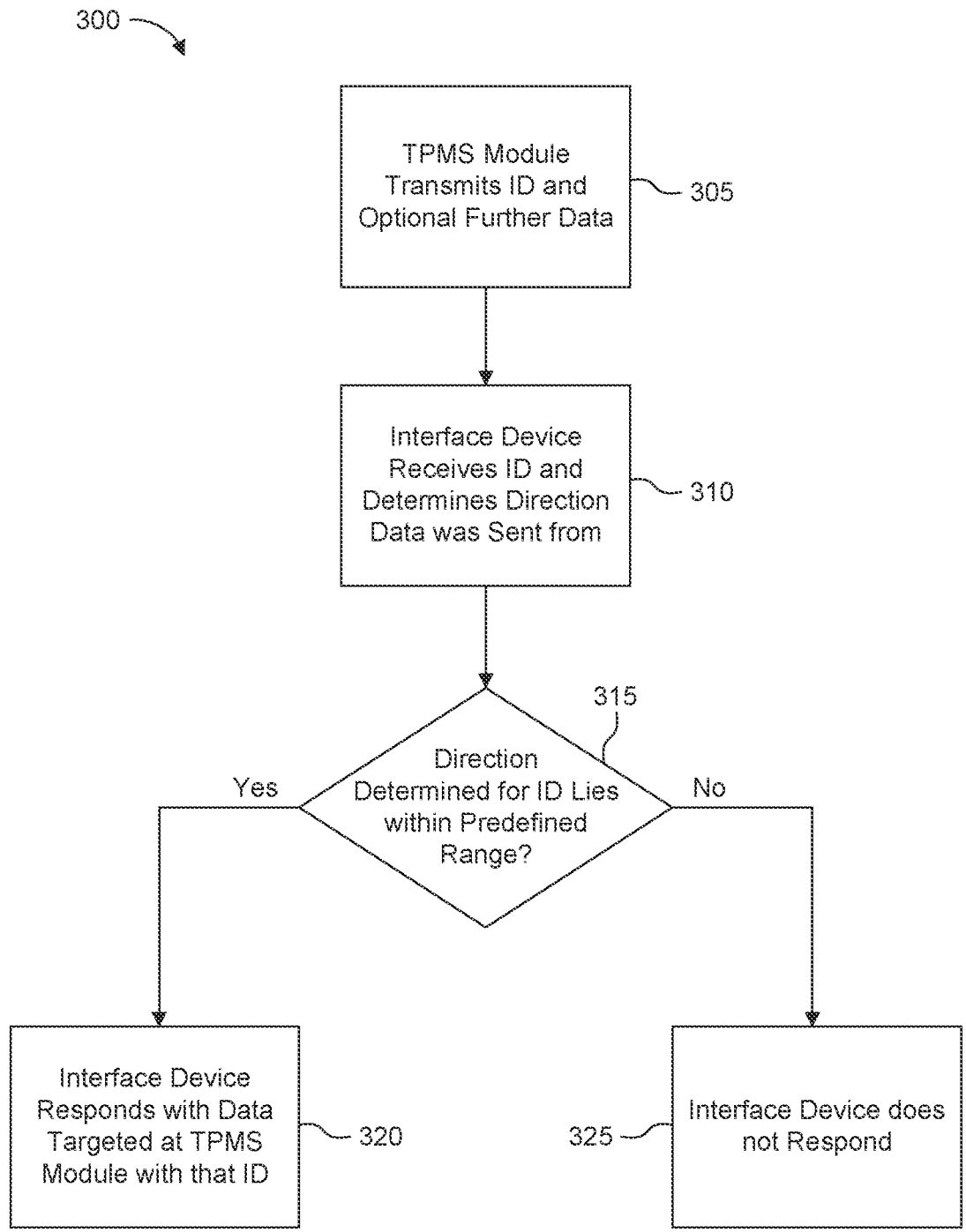
FIG. 3 is a flowchart of a method of selectively communicating with a TPMS sensor module using Angle of Arrival (AoA) measurements according to one or more embodiments.

FIG. 3 is a flowchart of a method 300 of selectively communicating with a TPMS sensor module using AoA measurements according to one or more embodiments. Method 300 includes a TPMS sensor module transmitting its ID in a TPMS signal with optional further data (operation 305). The interface device 110 receives the ID and determines the angular direction the TPMS signal was sent from (operation 310). The interface device 110 compares the determined angular direction of the transmission path of the TPMS signal with a predefined angular window or range (operation 315) and determines whether to communicate with the TPMS sensor module (Yes or No). If the determined angular direction is within the predefined angular window (Yes), the interface device 110 responds with TPMS addressed messages that target the TPMS sensor module with the selected ID (operation 320). The addressed messages may include a request for data (e.g., sensor data and/or diagnostic data) from the selected TPMS sensor module. If the determined angular direction is not within the predefined angular window (No), the interface device 110 does not respond to the TPMS sensor module that is located outside the predefined angular window (operation 325). After a predetermined time period without receiving a response from an interface device (i.e., a time out period), the TPMS sensor module returns to a low power state.

Figure 4:
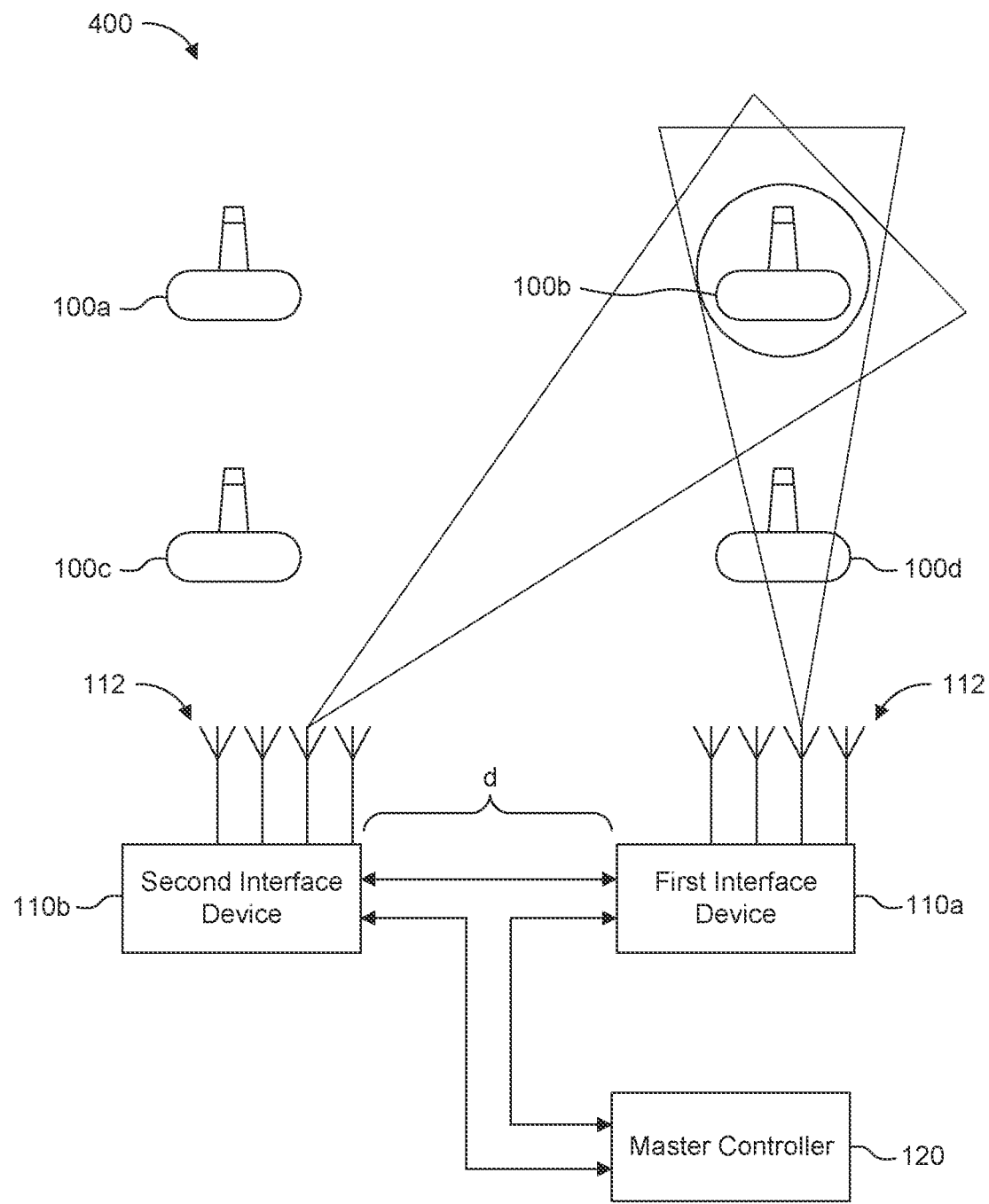
FIG. 4 is a schematic view of a TPMS sensor module communication system according to one or more embodiments.

FIG. 4 is a schematic view of a TPMS sensor module communication system 400 according to one or more embodiments. Like system 200, TPMS sensor module communication system 400 uses AoA measurements. It may also be used to perform AoD measurements depending on the desired implementation. However, TPMS sensor module communication system 400 includes multiple interface devices, including a first interface device 110a and a second interface device 110b, to perform the selection for communication. One of the interface devices 110a, 110b may be configured as a slave device and the other may be configured as a master device that ultimately makes the selection. Alternatively, both interfaces 110a, 110b are slave devices and an optional master controller 120 may be provided that communicates with both interface devices 110a, 110b and makes the selection.

Each interface device 110a, 110b receives TPMS signals from the TPMS sensor modules 100a-100d and determines the angular direction of each TPMS signal. The master device collects the angular direction information for each TPMS signal and determines an absolute position (including angle and distance) of a corresponding TPMS sensor module based on the measured angular direction at both interface devices 110a, 110b and the known arrangement of the interface devices 110a, 110b with respect to each other. For example, locations of the interface devices 110a, 110b may be fixed with a fixed distance d therebetween. In particular, the master device triangulates the absolute position of a corresponding TPMS sensor module using the angular direction information measured at each interface device 110a, 110b and the predefined distance d between interface devices 110a, 110b.

The master device is configured to determine the positions of each TPMS sensor module and select the sensor ID of the TPMS sensor module that is either located in a predetermined area or simply closest to a certain point. The predetermined area may be defined by the intersection of the angular cones that represent the two angular windows of the interface devices 110a, 110b. Finally, the master device triggers one of the interface devices to transmit one or more messages that are addressed to the TPMS sensor module with the selected ID. In this case, TPMS sensor module 100b is found to be located in a predetermined area defined by a predetermined angular window and a predefined distance range and is selected for communication.

For this method, in order to facilitate the location, the interface device 110a, 110b can also already preselect a TPMS sensor module that is located in a certain predetermined angular window, before sending the information to the master device. In other words, each interface device 110a, 110b may be preconfigured with a different angular window according to their select position to each other, and identify a corresponding TPMS sensor module that is determined to be within its predetermined angular window. Each interface device 110a, 110b then reports this TPMS sensor module to the master device (i.e., to either one of the interface devices 110a, 110b or to the master controller 120) for further processing and selection.

Figure 5:
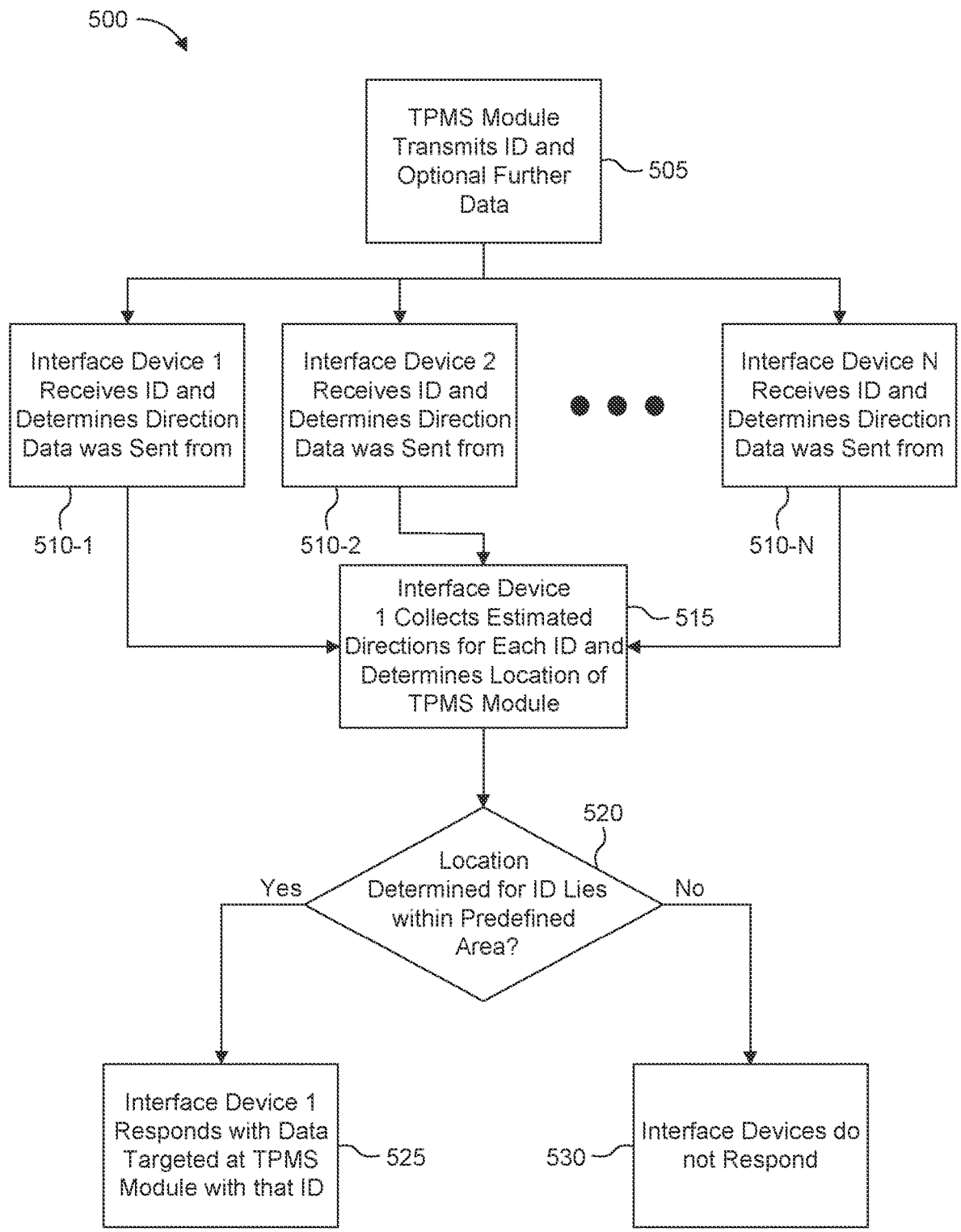
FIG. 5 is a flowchart of a method of selectively communicating with a TPMS sensor module using AoA measurements using multiple interface devices according to one or more embodiments.

FIG. 5 is a flowchart of a method 500 of selectively communicating with a TPMS sensor module using AoA measurements using multiple interface devices according to one or more embodiments. The method 500 includes a TPMS sensor module transmitting its ID in a TPMS signal with optional further data (operation 505). Each of the interface devices of N interface devices receives the TPMS signal with the ID and each interface device determines the respective angular direction the TPMS signal was sent from (operations 510-1, 510-2, ..., 510-N). Interface device 1, designated as the master device, collects the determined angular directions from each of the other interface devices and determines the location of the TPMS sensor module (operation 515). Interface device 1, designated as the master device, compares the determined location to a predefined area (e.g., defined by a predefined angular window and a predefined distance window) and determines whether the determined location is within the predefined area (operation 520) in order to determine whether to communicate with the TPMS sensor module (Yes or No). If the determined location is within the predefined area (Yes), the interface device 1 responds with TPMS addressed messages that target the TPMS sensor module with the selected ID (operation 525). The addressed messages may include a request for data (e.g., sensor data and/or diagnostic data) from the selected TPMS sensor module. If the determined location is not within the predefined area (No), the interface devices do not respond to the TPMS sensor module that is located outside the predefined area (operation 530). After a predetermined time period without receiving a response from an interface device (i.e., a time out period), the TPMS sensor module returns to a low power state.

Figure 6:
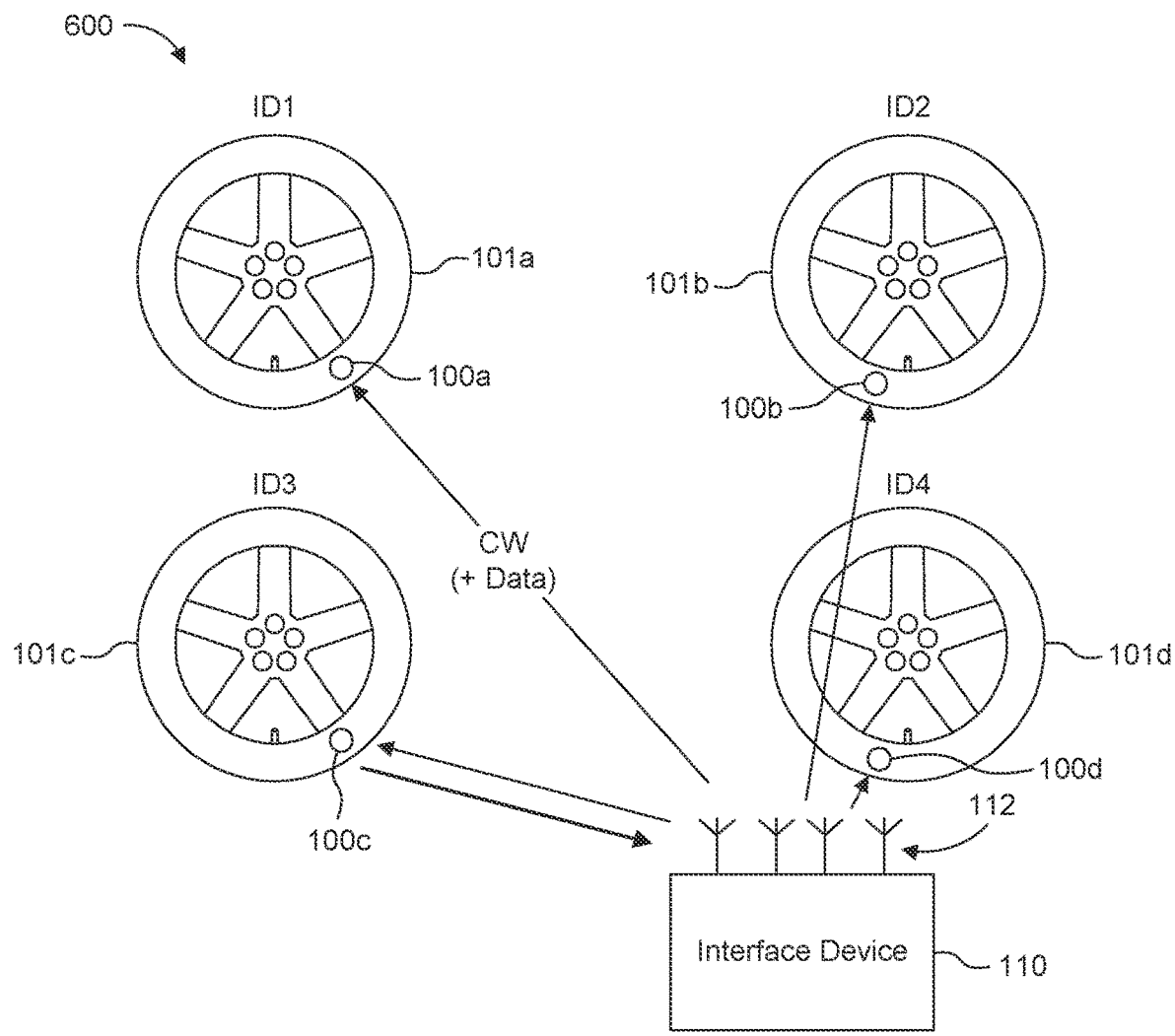
FIG. 6 is a schematic view of a TPMS sensor module communication system according to one or more embodiments.

FIG. 6 is a schematic view of a TPMS sensor module communication system 600 according to one or more embodiments. The TPMS sensor module communication system 600 uses AoD measurements for selecting a TPMS sensor module for communication. The TPMS sensor module communication system 600 includes the interface device 110 that includes an antenna array 112 used for transmitting and receiving RF signals.

During a discovery and selection phase, the antennas of the antenna array 112 are used to transmit phase shifted signals (i.e., advertising or detection signals) according to an antenna switching scheme. The phase shifted signals include an identifier (ID) of the interface device 110 so that a TPMS sensor module can respond with messages addressed to that ID if it determines that communication is to be established with that interface device 110 based on AoD measurements.

In particular, each antenna of the antenna array 112 is located at a different distance from a TPMS senor module due to the spatial separation from each other. This holds true for each TPMS sensor module 100a-100d. The differences in travel distance from respective antenna of the array 112 results in each wake-up signal transmitted from one antenna having a different phase shift with respect to the wake-up signals transmitted by the other antennas. These phase shifts between the antennas can be detected by the MCU 12 of a TPMS sensor module to determine the angular direction of the interface device 110.

During transmission of the phase shifted signals (i.e., advertising or detection signals), the interface device 110 switches between different antennas of the antenna array 112 for transmitting respective wake-up signals. When the interface device 110 switches from one antenna to another antenna for transmitting a wake-up signal, a phase shift between the two transmitted signals occurs due to differences in travel distance of the signals. One or more wake-up signals (e.g., a first one of the adverting signals) include one or more messages that may contain information about the antenna switching scheme, such as the number of antennas used, their spatial arrangement, and the switching time. The MCU 12 is configured to use this information in order to evaluate the phase shifts of the incoming wake-up signals for determining the angular direction of the interface device 110. The one or more messages may also define a predefined angular window for the MCU 12 to use to evaluate the angular direction of the interface device 110. The one or more messages may also include a request for data (e.g., sensor data and/or diagnostic data) from the TPMS sensor module. Additionally, the interface device 110 can also extend the wake-up signals by a carrier wave, in order to improve the measurement accuracy, if needed.

Every time the interface device 110 switches to another antenna, a phase shift is generated in the advertisement signal received by a TPMS sensor module. Thus, the advertisement signal used for AoD measurements may be generally referred to as a phase shifting signal. The TPMS sensor module 100 receives the phase shifted signals at its antenna 18 and the MCU 12 measures these phase shifts. Finally, with the information on the switching scheme and the antenna arrangement, the MCU 12 can unambiguously determine the angular direction of the interface device 110. If by performing a comparison the MCU 12 determines that this angular direction matches (i.e., is within) a certain predefined angular window, the MCU 12 responds to the interface device 110 by, for example, transmitting the requested data (e.g., sensor and/or diagnostic data) via messages addressed to the ID of the interface device 110. Otherwise, if the angular direction does not match the predefined angular window, the MCU 12 does not react to the wake-up signal and returns to a low power state.

In this example, TPMS sensor module 100c determined that the measured angular direction of the interface device 110 was within the predefined angular window and responds to the wake-up signal with a TPMS data signal. The other TPMS sensor modules 100a, 100b, and 100d each determine that the respective measured angular direction of the interface device 110 according to their position therefrom was not within the predefined angular window. Therefore, they do not transmit a response back to the interface device 110.

In summary, the interface device 110 transmits an advertising packet that is followed by a carrier wave (e.g., a constant tone extension). While transmitting the carrier wave, the interface device 110 switches through its antennas. The advertising packet contains the duration of the carrier wave as well as antenna switching information, for example, defining a switching interval whereby switching from one antenna to the next one is performed (e.g., every 2 μs). The TPMS sensor module 100 receives the advertising packet and extracts the information about the duration of the carrier wave and the switching interval of the antennas. Based on this information, the TPMS sensor module 100 determines the phase shifts originating from the switching between antennas. From these phase shifts, combined with the information about the arrangement of the antennas (which is either predetermined and fixed or encoded in the advertising packet), the TPMS sensor module 100 can determine the angle of departure, and then subsequently compare the angle of departure to a predetermined angular window to determine whether to establish a data communication link with the interface device 110.

Similar to the arrangement shown in FIG. 4, the AoD measurement method can be extended by using multiple interface devices 110. In this case, each interface device 110a, 110b also sends a unique angular range (i.e., a respective predefined angular window) with their advertising signal. The unique angular range is to be used by the TPMS sensor module 100 for comparing measured phase shifts. Specifically, a TPMS sensor module performs a separate analysis on each interface device 110a, 110b, including comparing its measured angular direction to a respective predefined angular window defined in the corresponding advertising signal. For example, the MCU 12 compares the measured angular direction of interface device 110a to a first predefined angular window and compares the measured angular direction of interface device 110b to a second predefined angular window that is different from the first predefined angular window. The TPMS sensor module then responds to the interface devices 110a, 110b only if it determines that all interface devices 110a, 110b (i.e., all measured angular directions) are within their respective predefined angular windows.

Figure 7:
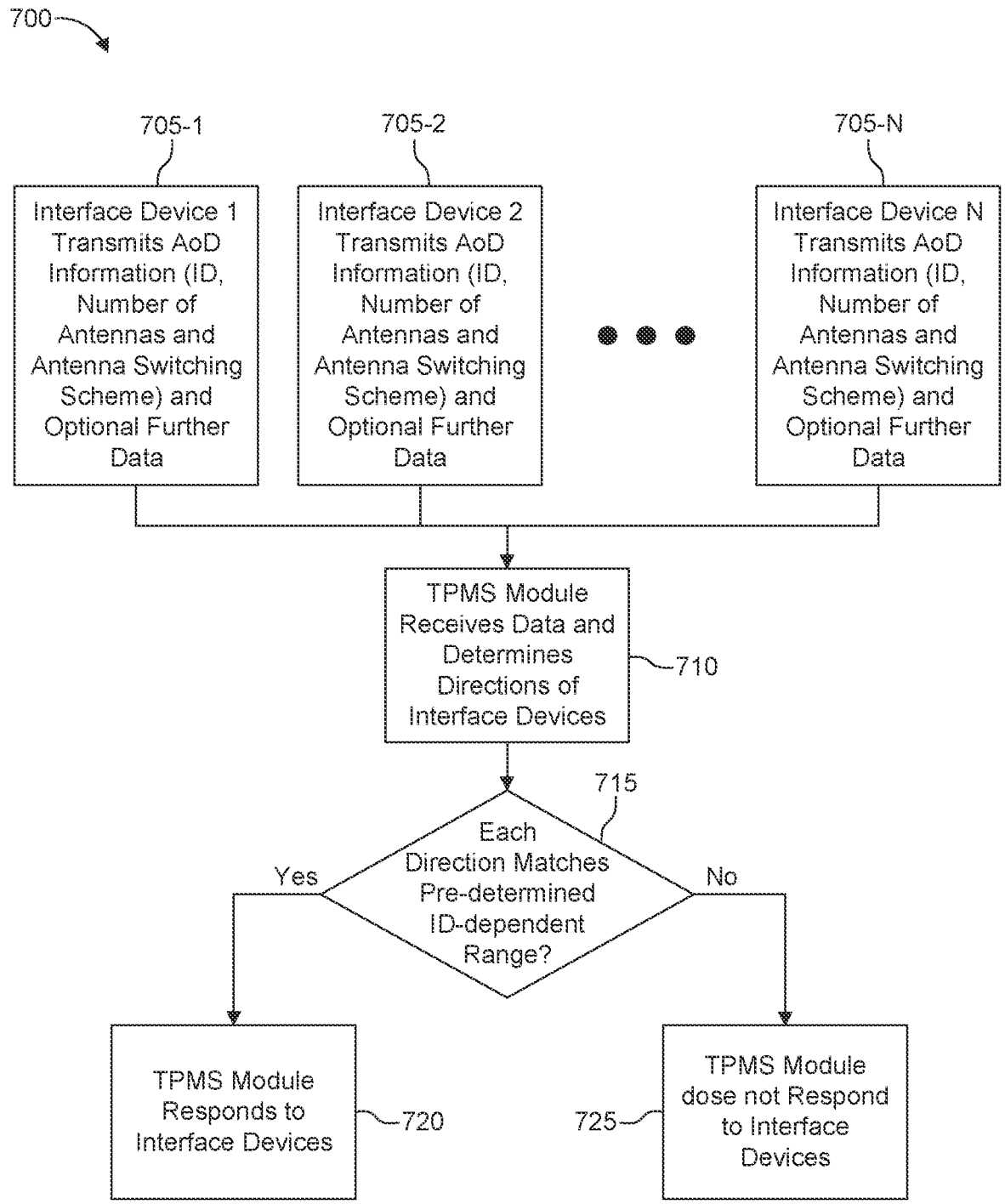
FIG. 7 is a flowchart of a method of selectively communicating with a TPMS sensor module using Angle of Departure (AoD) measurements using multiple interface devices according to one or more embodiments.

FIG. 7 is a flowchart of a method 700 of selectively communicating with a TPMS sensor module using AoD measurements using multiple interface devices according to one or more embodiments. The method 700 includes multiple interface devices 1, 2, . . . , N transmitting AoD information (e.g., interface device ID, a respective predefined angular window, and the antenna switching scheme, such as the number of antennas used, their spatial arrangement, and the switching time) and optional further data in wake-up signals (operations 705-1, 705-2, . . . , 705-N). A TPMS sensor module receives the wake-up signals and performs AoD measurements thereon to determine the angular direction of each of the multiple interface devices 1, 2, . . . , N (operation 710). The TPMS sensor module compares each determined angular direction to a respective predefined angular window to determine whether each determined angular direction is within its respective predefined angular window (operation 715). If yes, the TPMS sensor module responds to at least one of the interface devices 1, 2, . . . , N by, for example, transmitting the requested data (operation 720). If no, the TPMS sensor module does not respond to any of the interface devices 1, 2, . . . , N and returns to a low power state (operation 725).

Figure 8:
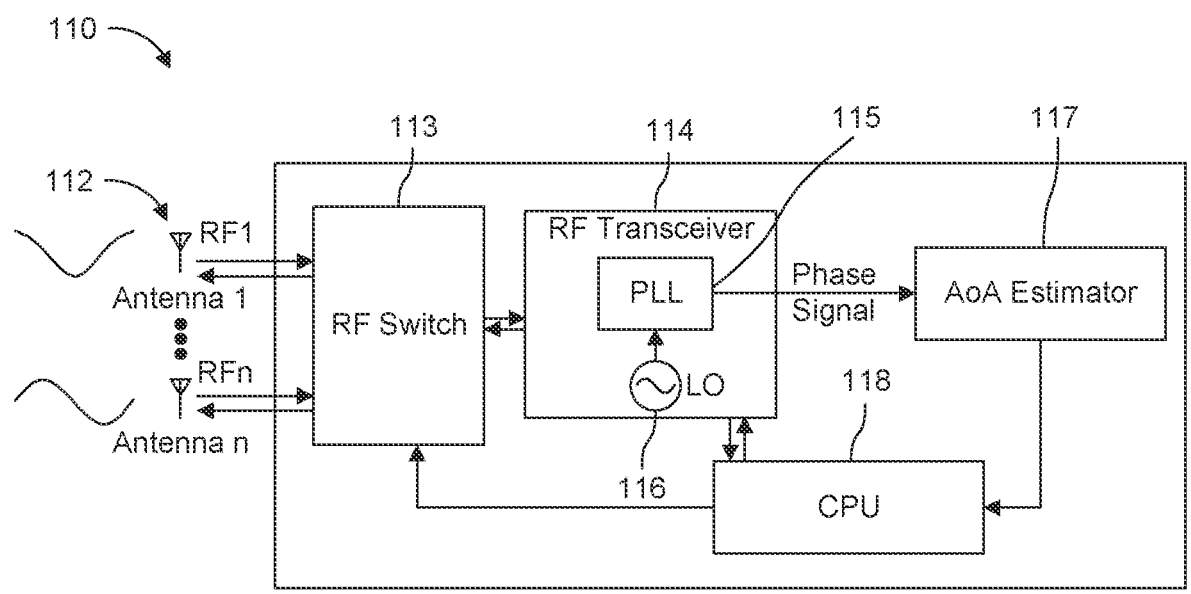
FIG. 8 is a schematic block diagram of an interface device according one or more embodiments.

FIG. 8 is a schematic block diagram of an interface device 110 according to one or more embodiments. The interface device 110 shown in FIG. 8 represents one possible implementation of the interface device 110 shown in FIG. 1. The interface device 110 includes a phase array antenna 112 deconstructed to show the individual antennas Antenna 1 . . . Antenna n of the array that can be used for AoA or AoD based selection methods described above. Antenna 1 transmits or receives an RF signal RF1 and Antenna n transmits or receives an RF signal RFn.

The interface device 110 further includes an RF switch 113, an RF transceiver 114 that includes a phase-locked loop (PLL) 115 and a local oscillator 116 (e.g., a crystal oscillator), an AoA estimator 117, and a central processing unit (CPU) 118. The RF transceiver 114, the AoA estimator 117, and the CPU 118 make up a processing circuit of the interface device 110 that processes received TPMS signals and establishes communication with a TPMS sensor module that matches with the desired angular window with respect to its angular direction.

The local oscillator 116 provides the input frequency for the PLL 115. The PLL 115 generates an output frequency from an input frequency, where the ratio between these two frequencies is exactly defined. If the RF transceiver 114 is in transmitting mode, the PLL output frequency is used as a carrier frequency for the transmission. If the transceiver 114 is in receiving mode, the PLL output frequency is mixed with the signal received from an antenna selected via the RF switch 113 in order to down-convert the frequency of the received signal to generate a base-band signal (i.e., a phase signal).

For AoA measurements, the RF switch 113 performs a time multiplexing switching of antenna to apply time multiplexed phase shifting to the received TPMS signal. Specifically, the RF switch 113 switches between antennas according to a predetermined antenna switching scheme to induce a phase shift in the TPMS signal. That is, the TPMS signal transmitted by a TPMS sensor signal becomes phase shifted at a selected antenna relative to its reception at the other antennas. Multiple phase shifts are induced and measured.

The RF switch 113 acts as an interface between the antennas and the RF transceiver 114, forwarding received signals to the RF transceiver 114 only from the antenna currently selected according to the antenna switching scheme. The CPU 118 transmit control signals to the RF switch 113 to control the antenna switching thereof to selectively couple and decouple the antennas to/from the RF transceiver 114. The RF switch 113 is configured to sequentially connect the plurality of antennas of the antenna array 112 one at a time to the RF transceiver 114 for reception of the TPMS signal based on the antenna switching scheme controlled by the CPU 118.

The RF transceiver 114 receives the TPMS signal from a selected antenna and uses PLL 115 to generate a phase signal. A local oscillator 116 generates a reference signal and inputs the reference signal to the PLL 115. The PLL 115 generates the phase signal based on both the TPMS signal received from the selected antenna and the reference signal. The phase signal has a phase shift associated with the selected antenna. In particular, the resulting mixed signal is a low frequency signal that can then be sampled by an ADC to determine the phase of the carrier wave relative to the PLL 115.

The PLL 115 transmits the phase signal to the AoA estimator 117. The AoA estimator is a processor or a processing circuit that comprises an ADC to sample the phase signal and one or more processors that evaluates the phase jumps (i.e., phase shifts) of the phase signal as the RF switch 113 switches between antenna and determines the angular direction from which the TPMS signal emanated. For example, the AoA estimator 117 may generate a phase shift profile for each TPMS signal and determine the angular direction of the source of the RF signal (i.e., an angular direction of an incoming RF signal) based on the corresponding phase shift profile. The AoA estimator 117 provides the measured angular direction to the CPU 118. The CPU 118 evaluates the angular direction by comparing it to a predetermined angular window. If the CPU 118 determines that the measured angular direction is within the predetermined angular window, the CPU 118 prepares addressed messages including the sensor ID of the target TPMS sensor module and a payload to be transmitted and provides the addressed messages to the RF transceiver 114 for transmission by one of the antenna. When transmitting, no antenna switching occurs and one antenna (e.g., Antenna 1) is selected for transmitting the RF signal.

IQ sampling may be used to determine the phase of the carrier wave relative to the PLL 115. In this case, two signals are generated. The first one (the I-signal) stems from mixing the received signal with the PLL's signal (I signal) directly; the second one (Q signal) is obtained from mixing the received signal with a signal that also stems from the PLL but is shifted by 90°. The reference signal provided from the PLL 115 can ideally be the same as the carrier wave frequency. After mixing and low-pass-filtering, if the PLL frequency ideally matches the carrier wave frequency, the resulting I and Q signals are constant, i.e., the oscillating part is removed. The AoA estimator 117 can then sample the I and Q signals and determine the phase of the carrier wave relative to the PLL (which is the same for all antennas), which is equal to the arctan(Q/I)

For AoD measurements, the AoA estimator 117 is disabled and the RF switch 113 performs a time multiplexing switching of antenna to apply time multiplexed phase shifting of the wake-up signal. Specifically, the RF switch 113 switches between antennas according to a predetermined antenna switching scheme to induce a phase shift in the wake-up signal. The CPU 118 may also provide AoD information (e.g., interface device ID and the antenna switching scheme, such as the number of antennas used, their spatial arrangement, and the switching time) and optional further data to the RF transceiver 114 for transmission in the wake-up signal. Again, the CPU 118 controls the switching scheme of the RF switch 113 via control signals transmitted thereto. The RF switch 113 is configured to sequentially connect the plurality of antennas of the antenna array 112 one at a time to the RF transceiver 114 based on the antenna switching scheme controlled by the CPU 118 for transmitting the wake-up signal (i.e., the phase shifted signals).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A tire pressure monitoring system (TPMS), comprising:
a TPMS sensor module having a sensor identifier (ID), wherein the TPMS sensor module comprises:
a pressure sensor configured to measure an internal air pressure of a first tire and generate first tire pressure information, and
a first radio frequency (RF) transceiver configured to transmit a TPMS signal that includes at least the sensor ID; and
a first communication interface device comprising:
a first antenna array configured to receive the TPMS signal, and
a first processing circuit configured to:
perform a first angle of arrival (AoA) measurement on the TPMS signal to determine whether a first angular direction of the TPMS sensor module with respect to the first antenna array is within a first predetermined angular window, and
establish communication with the TPMS sensor module based on a first condition that the first angular direction of the TPMS sensor module is within the first predetermined angular window, or
not establish communication with the TPMS sensor module based on a second condition that the first angular direction of the TPMS sensor module is not within the first predetermined angular window,
wherein at least one of:
the first communication interface device further comprises a first RF switch and a second RF transceiver, wherein the first RF switch is configured to switchably connect and disconnect a first plurality of antennas, of the first antenna array, to the second RF transceiver based on a first antenna switching scheme for performing the first AoA measurement, or
the TPMS further comprises a second communication interface device comprising: a second antenna array configured to receive the TPMS signal, and a second processing circuit configured to perform a second AoA measurement on the TPMS signal and to determine whether a second angular direction of the TPMS sensor module with respect to the second antenna array is within a second predetermined angular window.

2. The TPMS of claim 1, wherein, when the first condition is satisfied, the first communication interface device is configured to transmit, via the first antenna array, a message addressed with the sensor ID to the TPMS sensor module.

3. The TPMS of claim 2, wherein the message includes a request for data from the TPMS sensor module, and wherein the TPMS sensor module is configured to transmit the data to the first communication interface device in response to receiving the request.

4. The TPMS of claim 1, wherein the first communication interface device further comprises the first RF switch and the second RF transceiver, wherein the first RF switch is configured to switchably connect and disconnect the first plurality of antennas to the second RF transceiver based on the first antenna switching scheme.

5. The TPMS of claim 4, wherein the first RF switch is configured to sequentially connect the first plurality of antennas one at a time to the second RF transceiver based on the first antenna switching scheme.

6. The TPMS of claim 4, wherein the first processing circuit is further configured to measure a phase of the TPMS signal received at each of the first plurality of antennas, and determine the first angular direction of the TPMS signal based on the measured phase of the TPMS signal received at each of the first plurality of antennas and based on the first antenna switching scheme.

7. The TPMS of claim 6, wherein the first processing circuit is further configured to generate a first phase shift profile for the TPMS signal based on the measured phase of the TPMS signal received at each of the first plurality of antennas, and determine the first angular direction of the TPMS signal based on the generated first phase shift profile.

8. The TPMS of claim 4, wherein the first processing circuit is further configured to measure a plurality of phase shifts of the TPMS signal received at each of the first plurality of antennas, compare each of the plurality of phase shifts to a respective phase shift range, and determine that the first angular direction of the TPMS sensor module is within the first predetermined angular window when each of the plurality of phase shifts is within the respective phase shift range.

9. The TPMS of claim 1, further comprising:
the second communication interface device comprising:
the second antenna array configured to receive the TPMS signal, and
the second processing circuit configured to:
perform the second AoA measurement on the TPMS signal,
determine whether the second angular direction of the TPMS sensor module with respect to the second antenna array is within the second predetermined angular window,
generate an indication indicating whether or not the second angular direction is within the second predetermined angular window, and
provide the indication to the first communication interface device.

10. The TPMS of claim 9, wherein:
to establish the communication with the TPMS sensor module, the first processing circuit is configured to establish communication with the TPMS sensor module based on the first condition and a third condition being satisfied, the third condition being that the second angular direction is within the second predetermined angular window, or
to not establish communication with the TPMS sensor module, the first processing circuit is configured to not establish communication with the TPMS sensor module based on the second condition and a fourth condition being satisfied, the fourth condition being that the second angular direction is not within the second predetermined angular window.

11. The TPMS of claim 10, wherein, when the first and the third conditions are satisfied, the first processing circuit is further configured to transmit, via the first antenna array, a message addressed with the sensor ID to the TPMS sensor module.

12. The TPMS of claim 1, wherein the first RF transceiver is a Bluetooth Low Energy transceiver.

13. A method of communicating with a tire pressure monitoring system (TPMS) sensor module, the method comprising:
transmitting, by the TPMS sensor module, a TPMS signal that includes at least a sensor identifier (ID) of the TPMS sensor module;
performing, by a first communication interface device, a first angle of arrival (AoA) measurement on the TPMS signal to determine whether a first angular direction of the TPMS sensor module with respect to a first antenna array of the first communication interface device is within a first predetermined angular window;
performing, by a second communication interface device, a second AoA measurement on the TPMS signal to determine whether a second angular direction of the TPMS sensor module with respect to a second antenna array of the second communication interface device is within a second predetermined angular window; and
determining whether or not to communicate with the TPMS sensor module based on at least one of: whether the first angular direction is within the first predetermined angular window or whether the second angular direction is within the second predetermined angular window.

14. A tire pressure monitoring system (TPMS), comprising:
a first communication interface device comprising a first antenna array and a first radio frequency (RF) transceiver configured to transmit first phase shifted signals via the first antenna array according to a first antenna switching scheme, wherein at least one of the first phase shifted signals includes first angle of departure (AoD) information; and
a TPMS sensor module comprising:
a pressure sensor configured to measure an internal air pressure of a first tire and generate first tire pressure information,
a second RF transceiver configured to receive the first phase shifted signals, and
a processing circuit configured to:
perform, using the first AoD information, a first AoD measurement on the first phase shifted signals to determine a first angular direction of the first communication interface device with respect to the TPMS sensor module,
determine whether the first angular direction is within a first angular window, and
transmit a response signal to the first communication interface device based on a first condition that the first angular direction is within the first angular window, or
not transmit the response signal responsive to the first phase shifted signals based on a second condition that the first angular direction is not within the first angular window.

15. The TPMS of claim 14, wherein at least one of the first phase shifted signals includes a request for data, and the response signal includes the data.

16. The TPMS of claim 14, wherein the first AoD information includes the first antenna switching scheme.

17. The TPMS of claim 14, wherein the processing circuit is configured to not transmit the response signal responsive to the first phase shifted signals on the second condition.

18. The TPMS of claim 17, wherein the processing circuit is further configured to place the TPMS sensor module into a low power state based on the second condition that the first angular direction is not within the first angular window.

19. The TPMS of claim 14, wherein:
the first antenna array comprises a first plurality of antennas each configured to transmit one of the first phase shifted signals, wherein each of the first phase shifted signals has a different phase at a respective antenna of the TPMS sensor module, and
the first communication interface device includes a first RF switch configured to switchably connect and disconnect the first plurality of antennas to the first RF transceiver based on the first antenna switching scheme for transmitting the first phase shifted signals.

20. The TPMS of claim 19, wherein the first RF switch is configured to sequentially connect the first plurality of antennas one at a time to the first RF transceiver based on the first antenna switching scheme.

21. The TPMS of claim 19, wherein the processing circuit is further configured to measure a phase of each of the first phase shifted signals at the respective antenna of the TPMS sensor module, and determine the first angular direction of the first communication interface device based on the measured phases of the first phase shifted signals and based on the first antenna switching scheme.

22. The TPMS of claim 19, wherein the processing circuit is further configured to measure a plurality of phase shifts of the first phase shifted signals received at the respective antenna of the TPMS sensor module, compare each of the plurality of phase shifts to a respective phase shift range, and determine that the first angular direction is within the first angular window when each of the plurality of phase shifts is within the respective phase shift range.

23. The TPMS of claim 14, further comprising:
a second communication interface device comprising a second antenna array and a third RF transceiver configured to transmit second phase shifted signals via the second antenna array according to a second antenna switching scheme, wherein at least one of the second phase shifted signals includes second AoD information,
wherein the second RF transceiver of the TPMS sensor module is configured to receive the second phase shifted signals, and
wherein the processing circuit is further configured to:
perform, using the second AoD information, a second AoD measurement on the second phase shifted signals to determine whether a second angular direction of the second communication interface device with respect to the TPMS sensor module is within a second angular window, and
transmit the response signal to the first communication interface device in response to both the first condition and a second condition being satisfied, the second condition being that the second angular direction is within the second angular window.

24. The TPMS of claim 23, wherein the processing circuit is further configured to not establish communication with either of the first communication interface device or the second communication interface device in response to a third condition being satisfied, the third condition being that the first angular direction is not within the first angular window or the second angular direction is not within the second angular window.

25. The TPMS of claim 14, wherein the second RF transceiver is a Bluetooth Low Energy transceiver.

26. A method of communicating with a tire pressure monitoring system (TPMS) sensor module, the method comprising:
transmitting, by a communication interface device, phase shifted signals according to an antenna switching scheme, wherein at least one of the phase shifted signals includes first angle of departure (AoD) information;
transmitting, by a communication interface device, phase shifted signals according to an antenna switching scheme, wherein at least one of the phase shifted signals includes first angle of departure (AoD) information;
performing, by the TPMS sensor module, an angle of departure (AoD) measurement on the phase shifted signals to determine whether an angular direction of the communication interface device with respect to the TPMS sensor module is within an angular window; and
transmitting, by the TPMS sensor module, a response signal to the communication interface device in response to determining that the angular direction is within the angular window; or
determining, by the TPMS sensor module, not to transmit the response signal responsive to the phase shifted signals in response to determining that the angular direction is not within the angular window.

\* \* \* \* \*